(12) United States Patent
Norman et al.

(10) Patent No.: US 7,495,610 B1
(45) Date of Patent: Feb. 24, 2009

(54) SYSTEM AND METHOD FOR DECIMATING GLOBAL POSITIONING SYSTEM SIGNALS

(75) Inventors: Charles Norman, Huntington Beach, CA (US); Richard Keegan, Palos Verdes Estates, CA (US)

(73) Assignee: RF Micro Devices, Inc., Greensboro, NC (US)

( * ) Notice: Subject to any disclaimer, the term of this patent is extended or adjusted under 35 U.S.C. 154(b) by 543 days.

(21) Appl. No.: 11/126,909

(22) Filed: May 11, 2005

(51) Int. Cl.
G01S 5/14 (2006.01)
H04B 1/69 (2006.01)
G06F 17/17 (2006.01)
(52) U.S. Cl. ........... 342/357.12; 375/150; 708/313
(58) Field of Classification Search ......... 375/149, 375/150, 152; 708/313
See application file for complete search history.

(56) References Cited

U.S. PATENT DOCUMENTS 5,079,734 A * 1/1992 Riley ................. 708/313
5,455,782 A * 10/1995 Young et al. .......... 708/313
2002/0025006 A1* 2/2002 Mehrnia et al. ....... 375/316
2006/0056497 A1* 3/2006 Lennen ............... 375/150

* cited by examiner

Primary Examiner—Gregory C Issing
(74) Attorney, Agent, or Firm—Withrow & Terranova, P.L.L.C.

(57) ABSTRACT

A system and method for sampling signal in a Global Positioning System (GPS) receiver or Code Division Multiple Access (CDMA) communication device are provided. In general, decimation circuitry is provided. The decimation circuitry includes filtering circuitry that performs a number of integrations of an input signal for each code chip, where each the number of integrations has a different start time but has a common integration period equal to the duration of a code chip. Each of the integrations provides an output sample of the input signal for one of a corresponding number of chip-phases. The output samples for the chip-phases are provided to processing circuitry for numerous code chips. The processing circuitry processes the output samples corresponding to a select one of the chip-phases such that the sampling rate of the digital signal is reduced.

21 Claims, 8 Drawing Sheets

SYSTEM AND METHOD FOR DECIMATING GLOBAL POSITIONING SYSTEM SIGNALS

FIELD OF THE INVENTION

The present invention relates to decimating a sampling rate of a digital signal and more particularly relates to decimating a sampling rate of a digital baseband signal in a Global Positioning System (GPS) receiver.

BACKGROUND OF THE INVENTION

Traditionally, baseband processing in a Global Positioning System (GPS) receiver is accomplished with special purpose digital hardware operating on digitized samples at a rate of 4 to 40 MHz. The higher performing receivers use the higher sampling rates. Currently, software implementations of GPS receivers have merely attempted to emulate this hardware processing. As such, these software implementations have been relegated to low performing, low sampling rate implementations.

Low performance is directly related to the low sampling rate. Prior to sampling, the digital baseband signal is filtered by a low-pass filter in order to prevent aliasing, where the bandwidth of the low-pass filter, which is referred to as the pre-sampling bandwidth, is limited by Nyquist criteria. More specifically, the pre-sampling bandwidth must be selected such that frequencies greater than ½ of the decimated sampling rate are removed from the digital baseband signal in order to prevent aliasing. However, in the case of low sampling rates, the low pre-sampling bandwidth obscures code transitions, which in a GPS system are transitions in the Pseudo-Random Noise (PRN) code in the L1 signal. Slower code transitions are more easily contaminated by reflected or multipath signals. Furthermore, optimum code error discriminators have been shown to produce higher Signal-to-Noise Ratio (SNR) results when the code transition is as fast as possible. As such, it has become standard for the sampling rate and the pre-sampling bandwidth to be direct measures of the potential performance of a GPS receiver.

One solution that provides improved performance is to increase the decimated sampling rate and thus the pre-sampling bandwidth. However, an increased sampling rate increases the required throughput of the processor of the GPS receiver. Thus, there remains a need for a decimator that provides a low sampling rate and does not require a low pre-sampling bandwidth.

SUMMARY OF THE INVENTION

The present invention provides a system and method for decimating a sampling rate of a digital signal in a Global Positioning System (GPS) receiver or Code Division Multiple Access (CDMA) communication device. In general, decimation circuitry of the present invention includes filtering circuitry that performs a number of integrations of samples of the digital signal for each code chip, where each of the number of integrations has a different start time but has a common integration period equal to the duration of a code chip. Each of the integrations provides an output sample of the digital signal for one of a corresponding number of chip-phases. The output samples for the chip-phases are provided to processing circuitry for numerous code chips. The processing circuitry processes the output samples corresponding to a select one of the chip-phases such that the sampling rate of the digital signal is reduced from the first sampling rate to the chip rate. The decimation circuitry of the present invention avoids the need for low-pass filtering of the digital signal prior to decimation. As a result, code transitions are not obscured by a low pre-sampling bandwidth and performance is substantially improved.

In one embodiment, the digital signal is a quadrature baseband signal including an in-phase baseband signal and a quadrature-phase baseband signal. In this embodiment, the filtering circuitry performs a number of integrations of samples of the in-phase baseband signal and the quadrature-phase baseband signal for each code chip, where each of the number of integrations has a different start time but has a common integration period equal to the duration of a code chip. The integrations provide an output sample of the in-phase baseband signal and the quadrature-phase baseband signal for each of a corresponding number of chip-phases. The output samples of the in-phase baseband signal and the quadrature-phase baseband signal are combined to provide a complex sample for each of the number of chip-phases. The complex samples for each of the chip-phases are provided to processing circuitry for numerous code chips. The processing circuitry processes the complex samples corresponding to a select one of the chip-phases such that the sampling rate of the digital signal is reduced from the first sampling rate to the chip rate.

In one embodiment, the system includes sample storage and reorganization circuitry operating to reorganize the complex samples for each of the chip phases for numerous code chips such that the complex samples are stored according to chip-phase. As a result, the complex samples may be transferred to the processing circuitry according to chip-phase. Further, multiple complex samples for any given chip-phase may be grouped together in a data word, such as a 32-bit data word, and transferred to the processing circuitry in order to further reduce the required throughput of the processing circuitry.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

FIGS. 8A and 8B illustrate the basic operation of the sample storage and reorganization circuitry of FIG. 7 according to one embodiment of the present invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The present invention provides a system for decimating a digital baseband signal in a Satellite Positioning System (SPS), such as a Global Positioning System (GPS) receiver, or other Code Division Multiple Access (CDMA) communication device. Note that a GPS receiver is a particular type of CDMA communication device. In general, the system includes decimation circuitry that operates to integrate a digital baseband signal provided at a first sampling rate over an entire code chip to provide a single complex sample. A number (N) of the complex samples are generated with different integration start times but with the same integration duration, thereby providing a number (N) of chip-phase matched filters for any given code chip. The complex samples are provided to processing circuitry, which selects one of the number (N) of complex samples for each code chip based on an estimated code phase. The remaining N−1 complex samples for each code chip are discarded. As a result, the sampling rate of the digital baseband signal is reduced from the first sampling rate to the code chip rate. Further, since decimation is achieved using the number (N) of chip-phase matched filters rather than by sub-sampling, low-pass filtering of the digital baseband signal is not required to prevent aliasing. As a result, code transitions are not obscured by a low pre-sampling bandwidth and performance is substantially improved.

Figure 1:
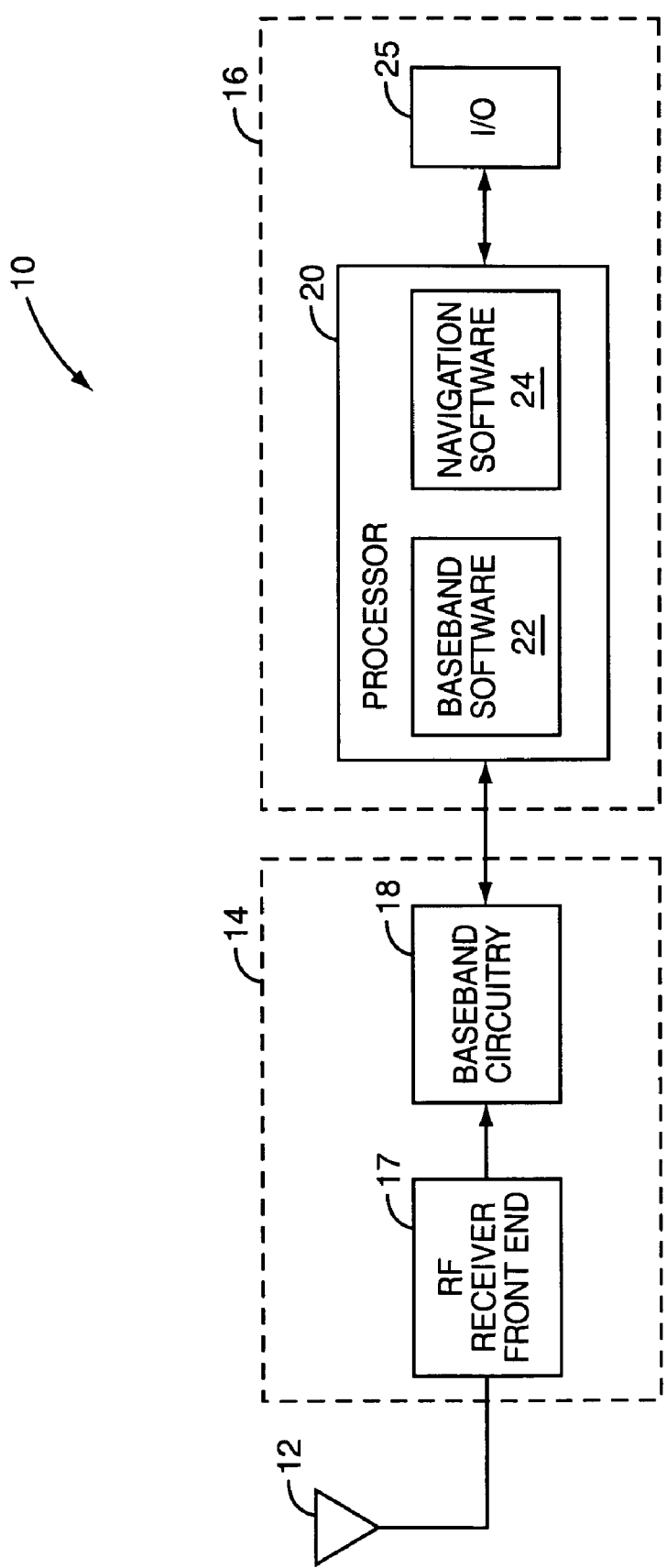
FIG. 1 illustrates an exemplary Global Positioning System (GPS) receiver according to one embodiment of the present invention.

FIG. 1 is a basic block diagram of an exemplary GPS receiver 10. While the present invention is described herein as applying to the GPS, the present invention may be used in any satellite positioning system. Further, the inventive decimation system and method described herein are not limited to a GPS receiver and may also be used in a CDMA communication system, as will be apparent to one of ordinary skill in the art upon reading this disclosure.

In general, the GPS receiver 10 includes an antenna 12, a receiver system 14, and a processing system 16. In operation, the GPS receiver 10 receives radio frequency signals, such as the L1 signal, from one or more GPS satellites via antenna 12. A receiver front end 17 operates to amplify, filter, and downconvert the radio frequency signals. The radio frequency signals may be downconverted to intermediate frequency (IF) signals or baseband signals depending on the particular implementation. The downconverted signals are then digitized and decimated by baseband circuitry 18 to provide digitized signals to the processing system 16, which processes the digitized signals to compute a position of the GPS receiver 10, user clock error (oscillator error), velocity, and the like, as is well understood in the art. The receiver front end 17 and the baseband circuitry 18 may be integrated into a single mixed signal semiconductor die.

As discussed below in more detail, the baseband circuitry 18 receives the digitized signals from the receiver front end 17. If the digitized signals from the receiver front end 17 are IF signals, the baseband circuitry 18 downconverts the digitized IF signals to baseband. Whether the baseband digitized signals are provided by downconverting the digital intermediate frequency signal or provided directly from the receiver front end 17, the baseband circuitry 18 decimates a sampling rate of the baseband digitized signals in order to reduce the computational complexity of the operations performed by processor 20.

After decimation, the baseband digitized signals are provided to the processor 20 for processing. Using baseband software 22 and navigation software 24, the processor 20 operates to demodulate the baseband digitized signals based on correlating the baseband digitized signals with locally generated Pseudo-Random Number (PRN) codes corresponding to the PRN codes of the GPS satellites. After demodulation, the processor 20 performs bit and frame synchronization in order to receive the Navigation Message communicated in the received signals, and computes the position of the GPS receiver 10, user clock error, velocity and the like, as will be apparent to one of ordinary skill in the art. The position of the GPS receiver 10, velocity, and the like may be communicated to an external system via interface 25.

Figure 2:
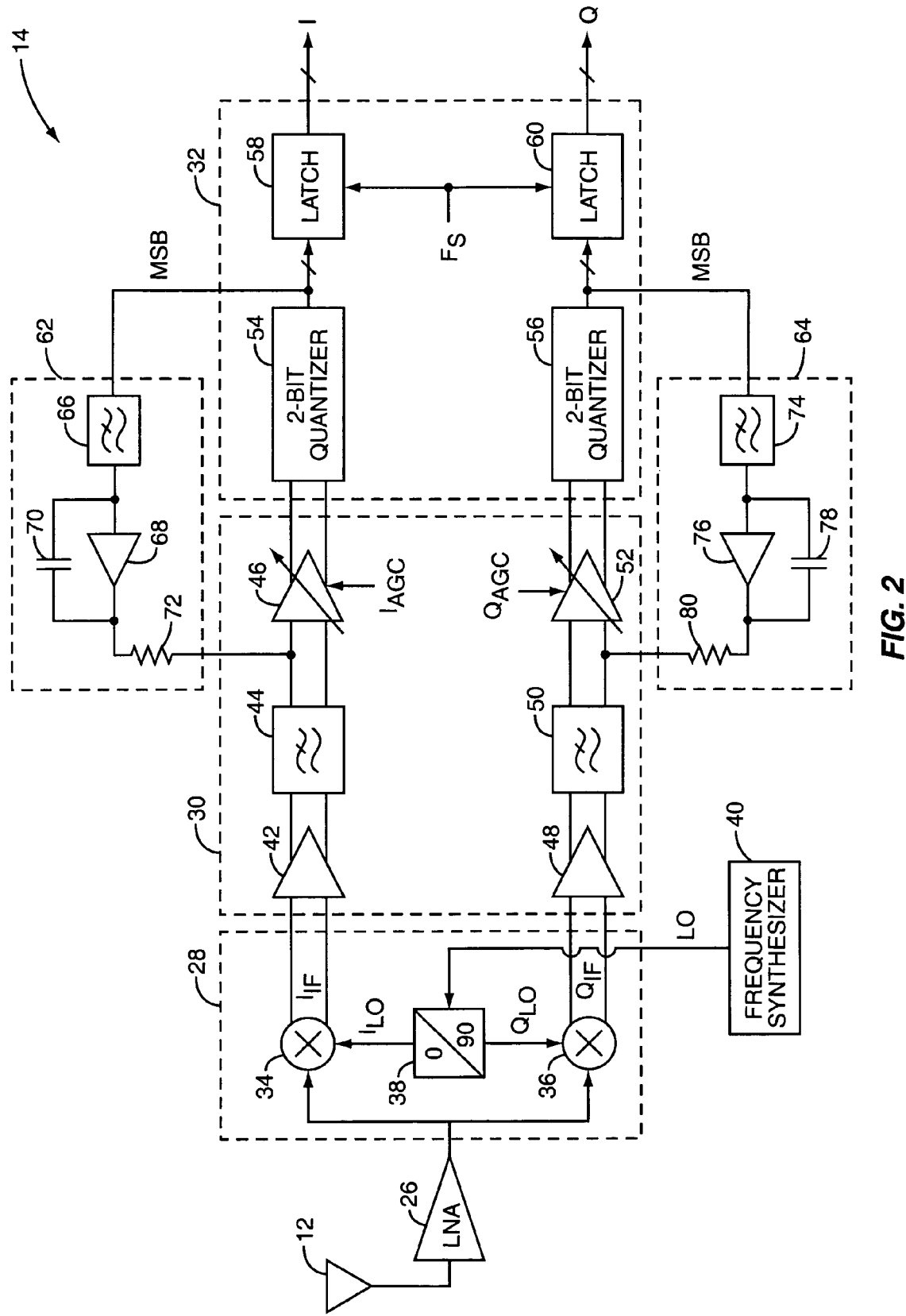
FIG. 2 illustrates an exemplary embodiment of the receiver front end of the GPS receiver of FIG. 1.

FIG. 2 illustrates an exemplary embodiment of the receiver front end 17. In this embodiment, the receiver front end 17 includes a low noise amplifier (LNA) 26, downconversion circuitry 28, amplification and filtering circuitry 30, and quantization circuitry 32. The LNA 26 amplifies the radio frequency signals from the antenna 12. In one embodiment, the radio frequency signals are the L1 signal from one or more GPS satellites. Downconversion circuitry 28 downconverts the radio frequency signals to provide either IF signals or baseband signals. As illustrated, in one embodiment, the downconversion circuitry 28 includes mixers 34 and 36 and a quadrature splitter 38. In general, frequency synthesizer 40 provides a local oscillator signal (LO). The quadrature splitter 38 converts the local oscillator signal (LO) into a in-phase LO signal ($I_{LO}$) and a quadrature-phase LO signal ($Q_{LO}$), where the quadrature-phase LO signal ($Q_{LO}$) is essentially 90 degrees out-of-phase with the in-phase LO signal ($I_{LO}$).

Mixer 34 multiplies the amplified radio frequency signals from the LNA 26 and the in-phase LO signal ($I_{LO}$) to provide an in-phase IF signal ($I_{IF}$). Similarly, the mixer 36 multiplies the amplified radio frequency signals from the LNA 26 and the quadrature-phase LO signal ($Q_{LO}$) to provide a quadrature-phase IF signal ($Q_{IF}$). In one embodiment, the center frequency of the in-phase IF signal ($I_{IF}$) and the quadrature-phase IF signal ($Q_{IF}$) is 4.092 MHz. However, this frequency is merely exemplary. Also, in another embodiment, the frequency of the local oscillator signal (LO) may be selected such that the mixers 34 and 36 provide in-phase and quadrature-phase baseband signals rather than the in-phase and quadrature-phase IF signals ($I_{IF}$, $Q_{IF}$). However, for the discussion below, it is assumed that the mixers 34 and 36 provide the in-phase and quadrature-phase IF signals ($I_{IF}$, $Q_{IF}$), as illustrated. It should be noted that the in-phase and quadrature-phase IF signals ($I_{IF}$, $Q_{IF}$) are differential signals, as indicated by the two parallel lines for each signal.

The in-phase and quadrature-phase IF signals ($I_{IF}$, $Q_{IF}$) are provided to the amplification and filtering circuitry 30. As will be apparent to one of ordinary skill in the art, the mixers 34 and 36 provide the in-phase and quadrature-phase IF signals ($I_{IF}$, $Q_{IF}$) at a frequency of $f_{RF}-f_{LO}$, where $f_{RF}$ is the center frequency of the radio frequency signals from the LNA 26 and $f_{LO}$ is the frequency of the local oscillator signal (LO) and thus frequency of the in-phase and quadrature-phase IF signals ($I_{IF}$, $Q_{IF}$). The output of the mixers 34 and 36 also include high frequency components at $f_{RF}+f_{LO}$. In general, the amplification and filtering circuitry 30 operates to remove the high frequency components from the output of the mixers 34 and 36 such that only the in-phase and quadrature-phase IF signals ($I_{IF}$, $Q_{IF}$) remain. In addition, the amplification and filtering circuitry 30 operates to provide amplitude gain control such that the in-phase and quadrature-phase IF signals ($I_{IF}$, $Q_{IF}$) are amplified to a desired level prior to digitization by the quantization circuitry 32.

In this embodiment, the amplification and filtering circuitry 30 includes an in-phase branch including amplifier 42, low-pass filter 44, and a variable amplifier 46. The amplifier 42 operates to amplify the in-phase IF signal ($I_{IF}$) and provide the amplified in-phase IF signal ($I_{IF}$) to the low-pass filter 44. The low-pass filter 44 operates to remove the high frequency component generated by the mixer 34 and any other high-frequency components from the amplified in-phase IF signal ($I_{IF}$) to provide a filtered in-phase IF signal ($I_{IF}$) to the variable amplifier 46. The variable amplifier 46 is controlled by a control signal ($I_{AGC}$) to provide amplitude gain control. More specifically, the variable amplifier 46 is controlled based on the control signal ($I_{AGC}$) to amplify the filtered in-phase IF signal ($I_{IF}$) to an appropriate level for digitization by the quantization circuitry 32. The control signal ($I_{AGC}$) is provided by an external source such as, but not limited to, the processor 20 (FIG. 1).

In a similar fashion, the amplification and filtering circuitry 30 includes a quadrature-phase branch including amplifier 48, low-pass filter 50, and a variable amplifier 52. The amplifier 48 operates to amplify the quadrature-phase IF signal ($Q_{IF}$) and provide the amplified quadrature-phase IF signal ($Q_{IF}$) to the low-pass filter 50. The low-pass filter 50 operates to remove the high frequency component generated by the mixer 36 and any other high-frequency components from the amplified quadrature-phase IF signal ($Q_{IF}$) to provide a filtered quadrature-phase IF signal ($Q_{IF}$) to the variable amplifier 52. The variable amplifier 52 is controlled by a control signal ($Q_{AGC}$) to provide amplitude gain control. More specifically, the variable amplifier 52 is controlled based on the control signal ($Q_{AGC}$) to amplify the filtered quadrature-phase IF signal ($Q_{IF}$) to an appropriate level for digitization by the quantization circuitry 32. The control signal ($Q_{AGC}$) is provided by an external source such as, but not limited to, the processor 20 (FIG. 1).

The filtered, amplified in-phase and quadrature-phase IF signals ($I_{IF}$, $Q_{IF}$) from the amplification and filtering circuitry 30 are digitized, or quantized, by the quantization circuitry 32. In the illustrated embodiment, the quantization circuitry 32 includes quantizers 54 and 56, which may also be referred to as analog-to-digital converters. In this embodiment, the quantizers 54 and 56 are each 2-bit quantizers. Accordingly, the quantizer 54 outputs a 2-bit representation, sign and magnitude, of the in-phase IF signal from the amplification and filtering circuitry 30, and the quantizer 56 outputs a 2-bit representation, sign and magnitude, of the quadrature-phase IF signal from the amplification and filtering circuitry 30. The outputs of the quantizers 54 and 56 are provided to latches 58 and 60 and clocked at a predetermined sampling rate ($F_S$). In one embodiment, the center frequency, or IF frequency, of the in-phase and quadrature-phase IF signals ($I_{IF}$, $Q_{IF}$) is 4.092 MHz, and the sampling rate ($F_S$) is 32.736 MHz. In this embodiment, the bandwidth of the low-pass filters 44 and 50 may be any value that satisfies the Nyquist criteria ($<=\frac{1}{2} F_S$), such as 8 MHz, in order to prevent aliasing.

The embodiment illustrated in FIG. 2 also includes zeroing, or centering, circuits 62 and 64. The zeroing circuits 62 and 64 operate to remove any offset voltage from the filtered in-phase and quadrature-phase IF signals ($I_{IF}$, $Q_{IF}$), as will be apparent to one of ordinary skill in the art. In this embodiment, the zeroing circuit 62 includes a low-pass filter 66, amplifier 68, capacitor 70, and resistor 72 arranged as shown. Similarly, the zeroing circuit 64 includes a low-pass filter 74, amplifier 76, capacitor 78, and resistor 80 arranged as shown.

Figure 3:
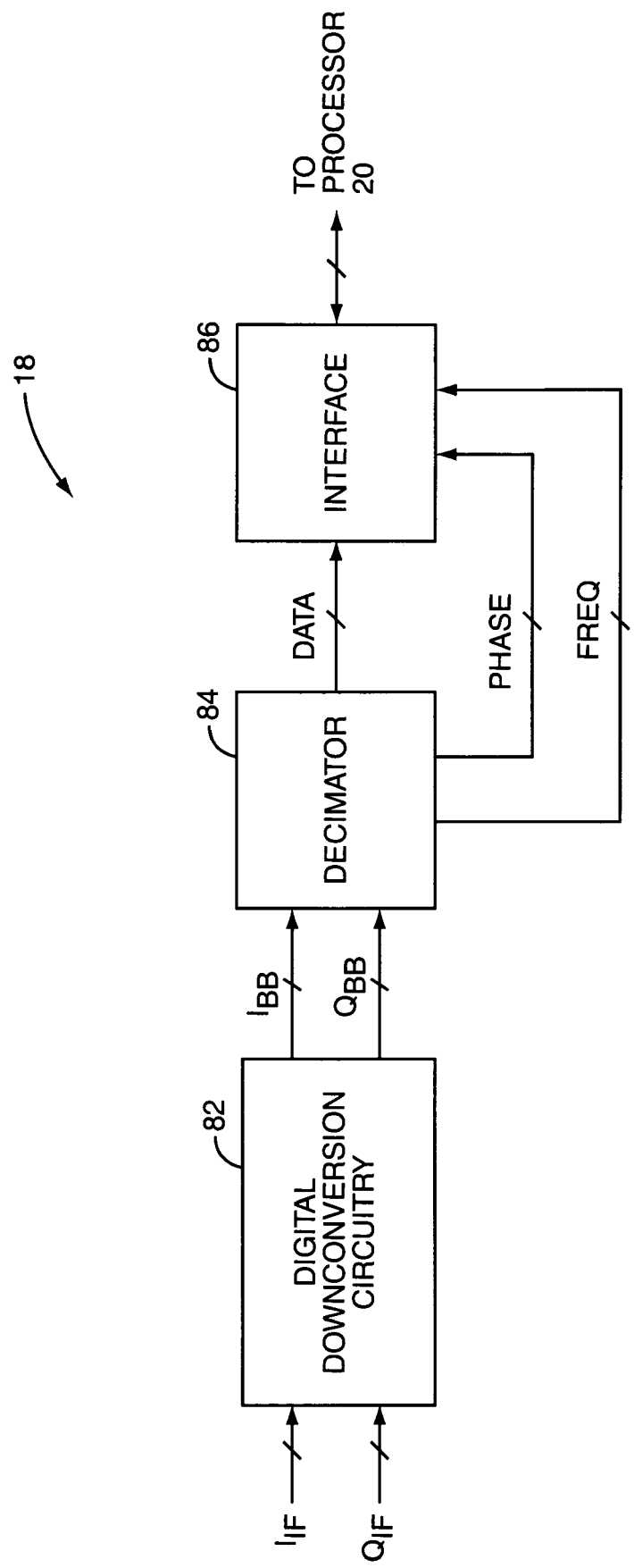
FIG. 3 is a basic block diagram of the baseband circuitry of the GPS receiver of FIG. 1 according to one embodiment of the present invention.

FIG. 3 is a more detailed illustration of one embodiment of the baseband circuitry 18. In general, the baseband circuitry 18 operates to downconvert the digitized in-phase and quadrature-phase IF signals ($I_{IF}$, $Q_{IF}$) from the receiver front end 17 (FIG. 1) to baseband, and reduce, or decimate, the sampling rate of the resultant baseband signals ($I_{BB}$, $Q_{BB}$). More specifically, the baseband circuitry 18 includes digital downconversion circuitry 82, decimation circuitry 84, and interface circuitry 86.

In operation, the digital downconversion circuitry 82 operates to convert the digitized in-phase and quadrature-phase IF signals ($I_{IF}$, $Q_{IF}$) from the receiver front end 17 to the baseband signals ($I_{BB}$, $Q_{BB}$). The digital downconversion circuitry 82 may also reduce the sampling rate of the baseband signals ($I_{BB}$, $Q_{BB}$).

Figure 4:
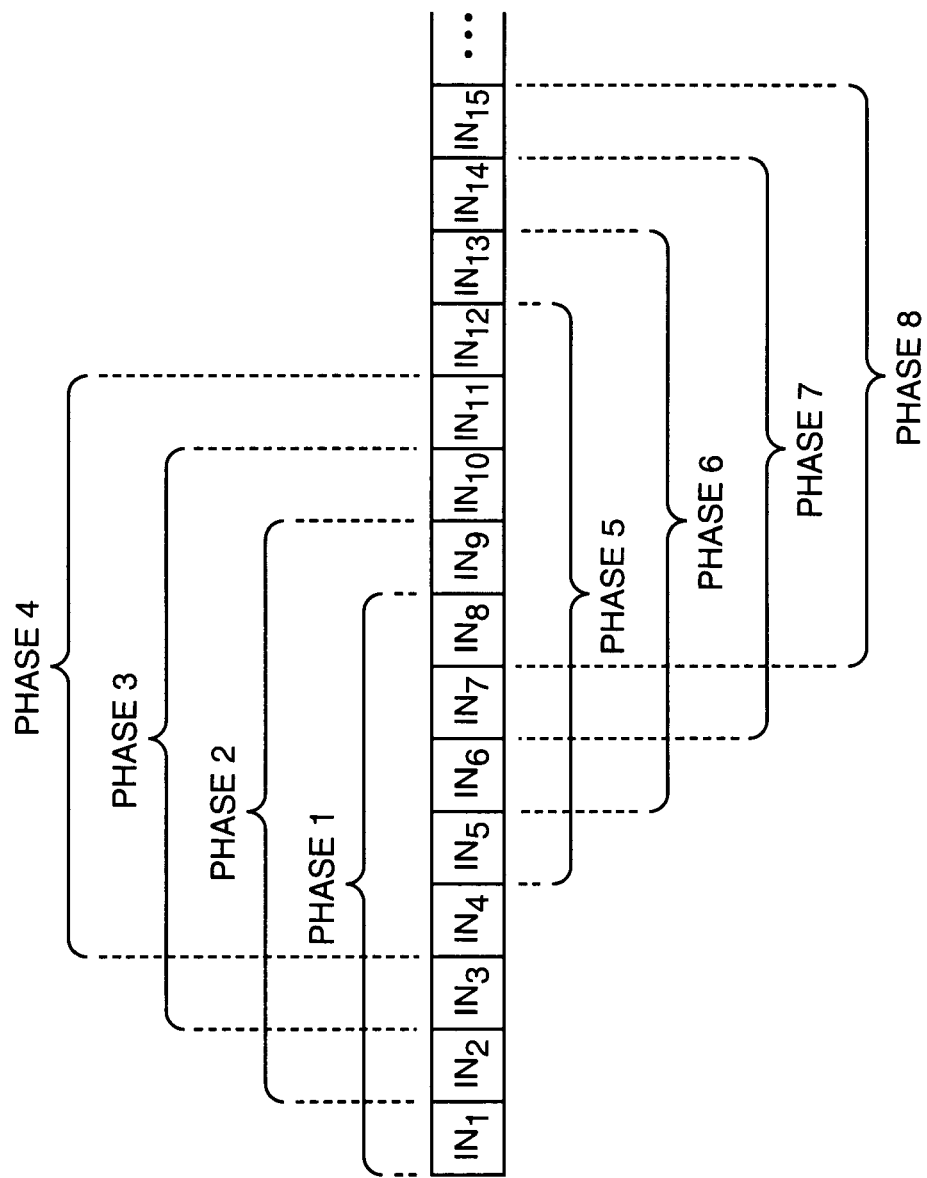
FIG. 4 illustrates the basic operation of one embodiment of the decimation circuitry of the present invention.

As described below in more detail, the decimation circuitry 84 of the present invention operates to reduce the sampling rate of the filtered baseband signals ($I_{BB}$, $Q_{BB}$). In general, the decimation circuitry 84 operates to integrate each of the filtered baseband signals ($I_{BB}$, $Q_{BB}$) over an entire code chip and provide a single complex sample. In the case of the PRN codes of the L1 signals of the GPS, each chip of the PRN code is approximately one microsecond. A number (N) of the complex samples are generated with different integration start times but with the same integration duration, thereby providing the number (N) of chip-phase matched filters for any given code chip. This concept is generally illustrated in FIG. 4 for N=8 and an input sampling rate of 8 times the code chip rate. As illustrated, input samples, which may be either the in-phase or quadrature-phase baseband signal ($I_{BB}$, $Q_{BB}$), are integrated to provide complex samples for each of 8 chip-phases (PHASE1-PHASE8). More specifically, input samples $IN_1$-$IN_8$ are integrated over a period equal to the duration of a code chip to provide a complex sample for chip-phase PHASE1. Likewise, input samples $IN_2$-$IN_8$ are integrated to provide a complex sample for chip-phase PHASE2. Input samples $IN_3$-$IN_{10}$, $IN_4$-$IN_{11}$, $IN_5$-$IN_{12}$, $IN_6$-$IN_{13}$, $IN_7$-$IN_{14}$, and $IN_8$-$IN_{15}$ are integrated to provide complex samples for chip-phases PHASE3-PHASE8, respectively. The process is repeated for subsequent input samples to obtain multiple complex samples for each of the chip-phases (PHASE1-PHASE8).

Figure 5:
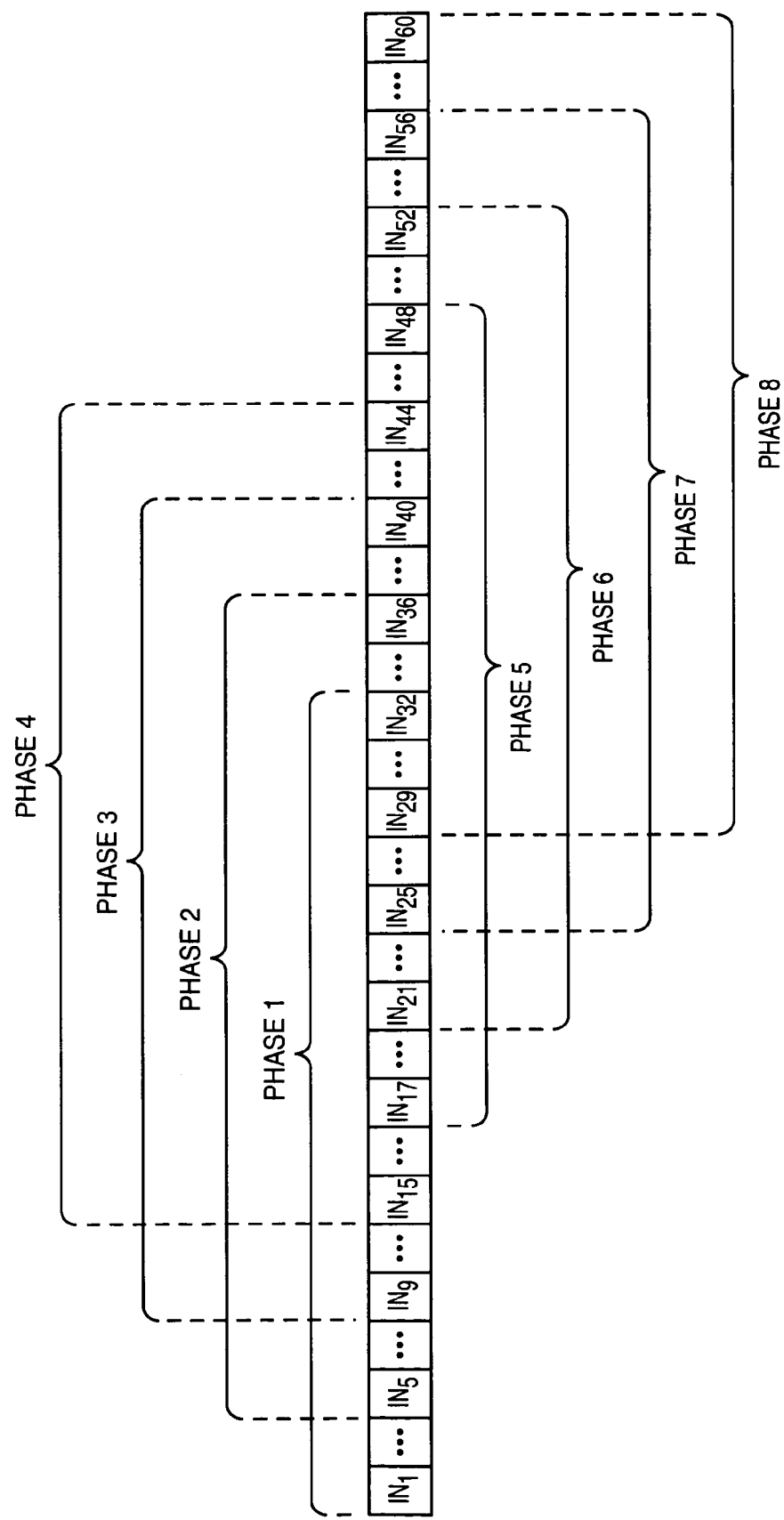
FIG. 5 illustrates the basic operation of another embodiment of the decimation circuitry of the present invention.

FIG. 5 generally illustrates the operation of the decimation circuitry 84 according to another embodiment of the present invention and is similar to FIG. 4. However, in this example, N=8 and the input sampling rate is 32 times the code chip rate. Accordingly, the actual output sampling rate of the decimation circuitry 84 is 4 times less than the input sampling rate, which is 8 times the sampling rate. More specifically, as illustrated in FIG. 5, input samples, which may be either the in-phase or quadrature-phase baseband signal ($I_{BB}$, $Q_{BB}$), are integrated to provide complex samples for each of 8 chip-phases (PHASE1-PHASE8). More specifically, input samples $IN_1$-$IN_{32}$ are integrated over a period equal to the duration of a code chip to provide a complex sample for chip-phase PHASE1. Likewise, input samples $IN_5$-$IN_{36}$ are integrated to provide a complex sample for chip-phase PHASE2. Input samples $IN_9$-$IN_{40}$, $IN_{13}$-$IN_{44}$, $IN_{17}$-$IN_{48}$, $IN_{21}$-$IN_{52}$, $IN_{25}$-$IN_{56}$, and $IN_{29}$-$IN_{60}$ are integrated to provide complex samples for chip-phases PHASE3-PHASE8, respectively. The process is repeated for subsequent input samples to obtain multiple complex samples for each of the chip-phases (PHASE1-PHASE8).

Returning to FIG. 3, the complex samples from the decimation circuitry 84 are provided to the processor 20 (FIG. 1) via interface circuitry 86. Using the software 22 or 24 (FIG. 1), the processor 20 selects one of the number (N) of complex samples corresponding to the desired chip-phase for each code chip based on an estimated code phase. As such, the processor 20 operates at the code chip rate. The remaining (N−1) complex samples for each code chip are discarded. In this manner, the processor 20 operates according to an effective sampling rate equal to the code chip rate. However, the actual sampling rate of the decimation circuitry 84 is N times the effective sampling rate, which in this embodiment is the code chip rate. Further, since decimation is achieved using the technique described herein rather than by sub-sampling, the need for low-pass filters having a low-bandwidth for filtering the digital in-phase and quadrature-phase baseband ($I_{BB}$, $Q_{BB}$) prior to decimation is avoided. Accordingly, code transitions, such as transitions in the PRN code of the L1 signal, are not obscured by a low pre-sampling bandwidth, and performance is substantially improved.

It should be noted that the processor 20 may perform various operations, each of which may process samples corresponding to a different chip phase. For example, the processor 20 may perform a number of correlation processes, where each of the correlation processes selects one of the number (N) of the complex samples corresponding to a desired chip-phase for each code chip. Further, each of the correlation processes may have a different desired chip-phase. Thus, the processor 20 may use one or more of the number (N) of the complex samples for each code chip, but a single process performed by the processor 20 uses only one of the number (N) of the complex samples for each code chip such that the processor 20 operates at the chip rate.

Figure 6:
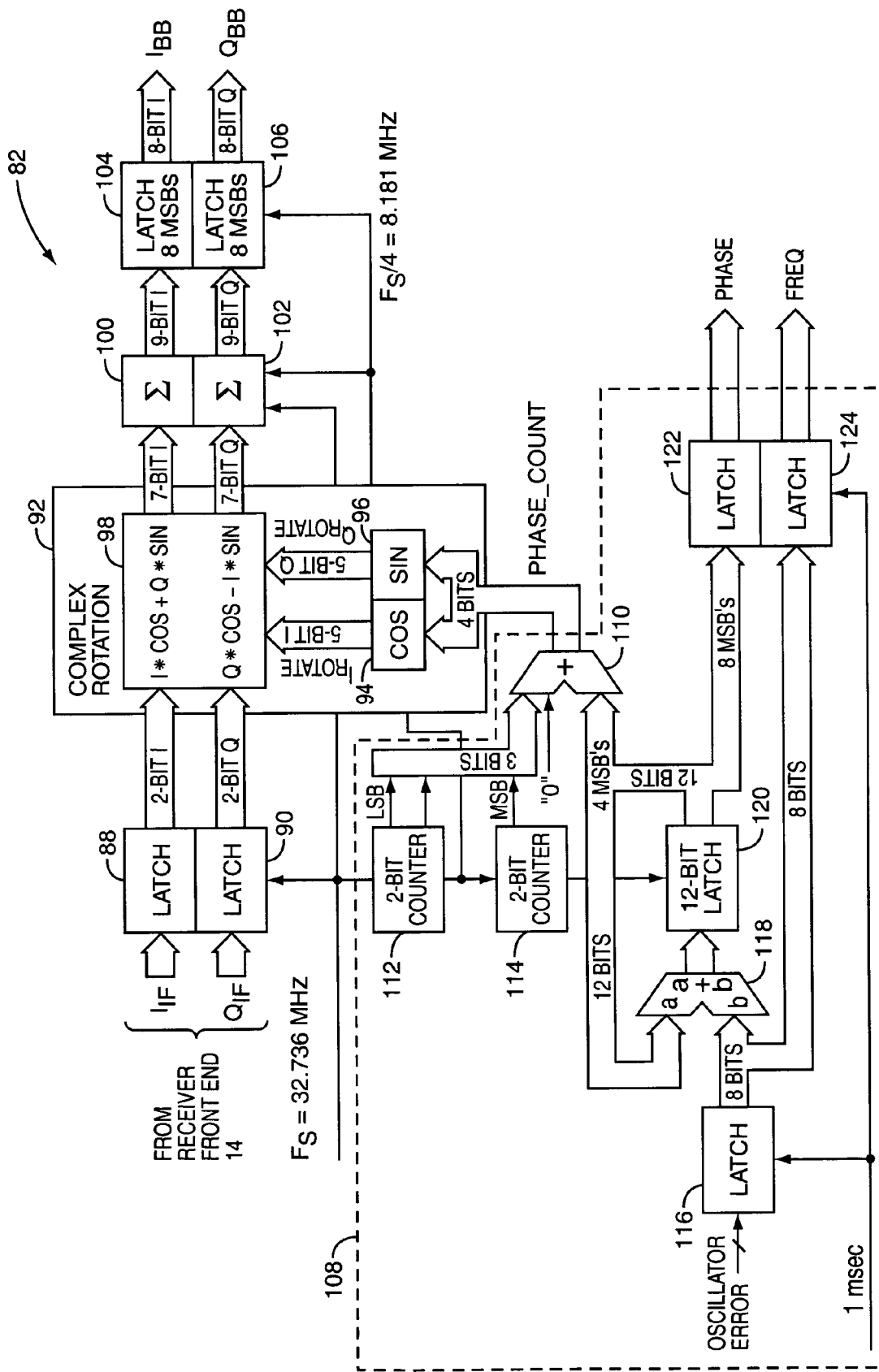
FIG. 6 illustrates an exemplary embodiment of the digital downconverter of FIG. 3.
Figure 7:
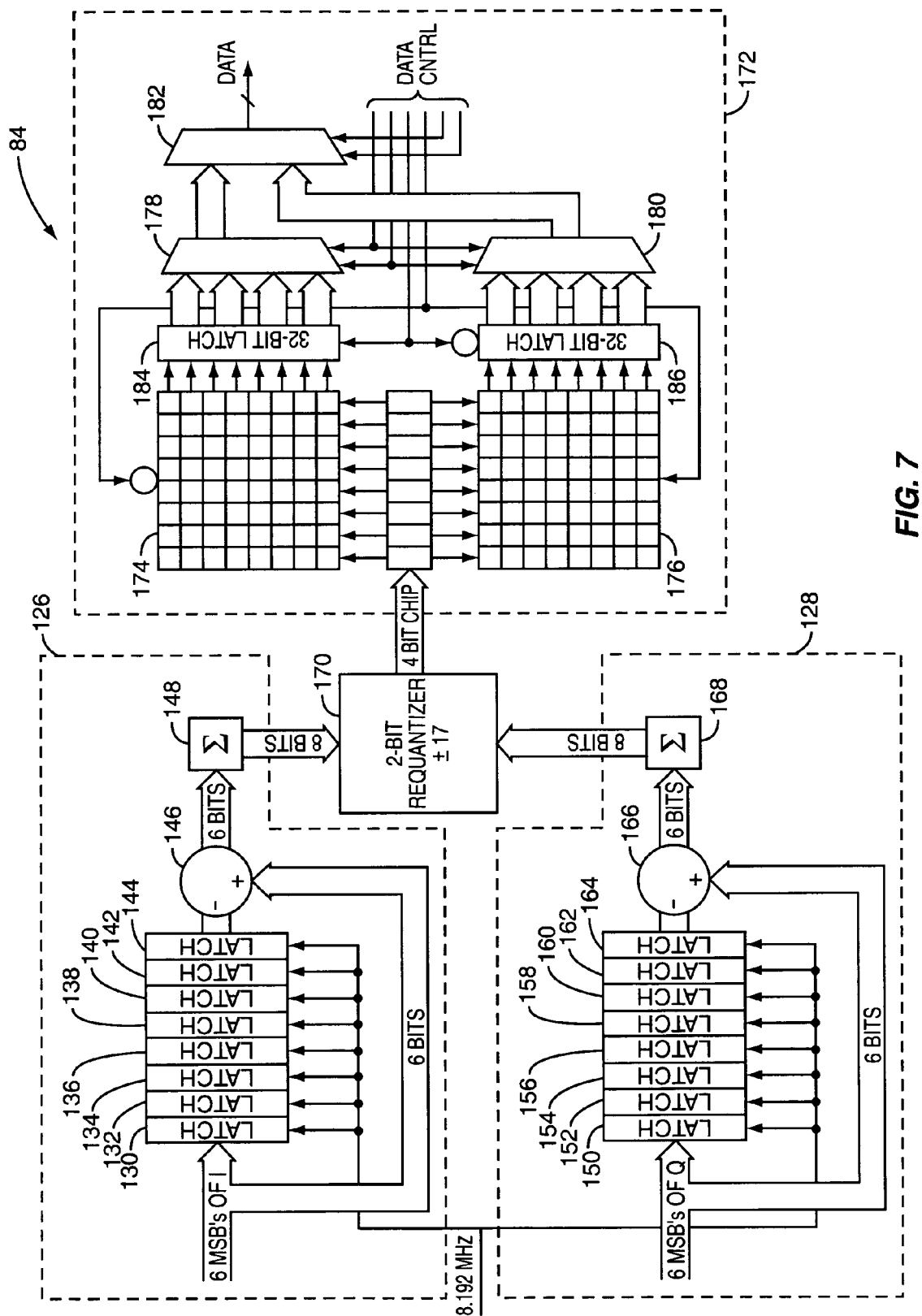
FIG. 7 illustrates an exemplary embodiment of the decimation circuitry of FIG. 3 according to one embodiment of the present invention.

FIGS. 6 and 7 illustrate exemplary embodiments of the digital downconversion circuitry 82 and the decimation circuitry 84 of FIG. 3. Referring first to FIG. 6, the digital downconversion circuitry 82 receives the digitized in-phase and quadrature-phase IF signals ($I_{IF}$, $Q_{IF}$) via latches 88 and 90. The latches 88 and 90 provide the digitized in-phase and quadrature phase IF signals ($I_{IF}$, $Q_{IF}$) to a complex rotation system 92. The complex rotation system 92 operates to down-convert the digitized in-phase and quadrature-phase IF signals ($I_{IF}$, $Q_{IF}$) to baseband.

More specifically, the operation of the complex rotation system 92 may be defined mathematically as follows. Each complex sample of the digitized in-phase and quadrature-phase IF signals ($I_{IF}$, $Q_{IF}$) may be defined as:

$$C_{SAMPLE} = I_{IF} + jQ_{IF}.$$

A complex rotation signal, which defines the frequency of rotation, may be defined as:

$$C_{ROTATE} = I_{ROTATE} + jQ_{ROTATE} = e^{-j \cdot \text{PHASE\_COUNT} \cdot \frac{\pi}{CPC}},$$

where PHASE_COUNT is an input to the complex rotation system 92 and is described below in more detail, and CPC is the number of counts per cycle of PHASE_COUNT divided by 2. Accordingly, the output of the complex rotation system 92 may then be defined as:

$$C_{BB} = C_{SAMPLE} \cdot C_{ROTATE}.$$

Thus, $$C_{RESULT} = I \cdot Re(C_{ROTATE}) - Q \cdot Im(C_{ROTATE}) + j \cdot (Im(C_{ROTATE}) + Q \cdot Re(C_{ROTATE})).$$

Substituting $$\cos\left(\text{PHASE\_COUNT} \cdot \frac{\pi}{CPC}\right) = Re\left(e^{-j \cdot \text{PHASE\_COUNT} \cdot \frac{\pi}{CPC}}\right)$$

and $$-\sin\left(\text{PHASE\_COUNT} \cdot \frac{\pi}{CPC}\right) = Im\left(e^{-j \cdot \text{PHASE\_COUNT} \cdot \frac{\pi}{CPC}}\right)$$

provides:

$$I_{BB} = I \cdot \cos\left(\text{PHASE\_COUNT} \cdot \frac{\pi}{CPC}\right) + Q \cdot \sin\left(\text{PHASE\_COUNT} \cdot \frac{\pi}{CPC}\right),$$

and $$Q_{BB} = Q \cdot \cos\left(\text{PHASE\_COUNT} \cdot \frac{\pi}{CPC}\right) - I \cdot \sin\left(\text{PHASE\_COUNT} \cdot \frac{\pi}{CPC}\right).$$

The complex rotation system 92 includes cosine generation circuitry 94, sine generation circuitry 96, and processing circuitry 98. Cosine circuitry 94 and sine generation circuitry 96 generate the quadrature rotation signal ($I_{ROTATE}$, $Q_{ROTATE}$). More specifically, the cosine generation circuitry 94 generates the in-phase rotation signal ($I_{ROTATE}$) according to the equation cos(PHASE_COUNT*π/CPC). The sine generation circuitry 96 generates the quadrature-phase rotation signal ($Q_{ROTATE}$) according to the equation sin(PHASE_COUNT*π/CPC). Using the in-phase and quadrature-phase rotation signals ($I_{ROTATE}$, $Q_{ROTATE}$), the processing circuitry 98 converts the digitized in-phase and quadrature-phase IF signals ($I_{IF}$, $Q_{IF}$) to baseband, thereby providing the in-phase and quadrature-phase baseband signals ($I_{BB}$, $Q_{BB}$).

Optionally, the digital downconversion circuitry 82 may include integrators 100 and 102 operating to integrate and dump samples of the baseband in-phase and quadrature-phase signals ($I_{BB}$, $Q_{BB}$) from the complex rotation system 92 in order to reduce the bandwidth of the signals and reduce the sampling rate. In the illustrated embodiment, the integrators 100 and 102 are clocked at a frequency equal to the sampling rate ($F_S$) divided by 4. Thus, the integrators 100 and 102 operate to reduce the sampling rate by a factor of four. However, the integrators 100 and 102 may be used to reduce the sampling rate by any integer depending on the particular implementation. The baseband in-phase and quadrature-phase signals ($I_{BB}$, $Q_{BB}$) are provided from the integrators 100 and 102 to the decimation circuitry 84 (FIG. 3) via latches 104 and 106, respectively.

The digital conconversion circuitry 82 also includes phase count generation circuitry 108 for generating the PHASE_COUNT input to the complex rotation system 92. In general, the PHASE_COUNT is provided such that the frequency of the rotation signal ($I_{ROTATE}$, $Q_{ROTATE}$) is ideally equal to the IF frequency of the digitized in-phase and quadrature-phase IF signals ($I_{IF}$, $Q_{IF}$). Further, the PHASE_COUNT may be adjusted from its ideal value in order to compensate for an oscillator error of the GPS receiver 10 (FIG. 1).

In this particular embodiment, the phase count generation circuitry 108 includes a first summation node 110 operating to provide the PHASE_COUNT by summing first and second inputs. The first input corresponds to the PHASE_COUNT when there is no oscillator error, and the second input is provided based on the oscillator error in order to adjust the PHASE_COUNT to compensate for the oscillator error. As a result, the PHASE_COUNT provided by the first summation node 110 is used by the cosine and sine generation circuitry 94 and 96 to generate the rotation signal ($I_{ROTATE}$, $Q_{ROTATE}$) such that the digitized in-phase and quadrature-phase IF signals ($I_{IF}$, $Q_{IF}$) are converted to baseband.

The first input of the first summation node 110 is provided from counters 112 and 114. In general, the 2-bit output of the counter 112 is combined with the most significant output bit of the counter 114 to provide the three most significant bits of the first input of the first summation node 110. A "0" is provided as the least significant bit of the first input of the first summation node 110. The second input of the first summation node 110 is provided to correct for the oscillator error of the GPS receiver 10 (FIG. 1). In this embodiment, the second input of the first summation node 110 is generated based on accumulating an oscillator error signal (OSCILLATOR ERROR) from an external device such as, but not limited to, the processor 20 (FIG. 1). The oscillator error signal is accumulated using latch 116, second summation node 118, and latch 120, as will be apparent to one of ordinary skill in the art upon reading this disclosure.

As illustrated, the phase count generation circuitry 108 also includes latches 122 and 124 for providing a phase output signal (PHASE) and a frequency output signal (FREQUENCY) to the interface circuitry 86 (FIG. 3). The phase and frequency output signals may be used by the processor 20 (FIG. 1) in order to synchronize commands providing the oscillator error signal to the time of application, where the time of application is the time at which a first sample is to be rotated based on a new value of the oscillator error signal.

FIG. 7 illustrates an exemplary embodiment of the decimation circuitry 84 according to the present invention. As discussed above and illustrated with respect to FIG. 4, the decimation circuitry 84 operates to integrate each of the filtered baseband signals ($I_{BB}$, $Q_{BB}$) over an entire code chip and provide a single complex sample. In the case of the PRN codes of the L1 signals of the GPS, each chip of the PRN code is approximately one microsecond. A number (N) of the complex samples are generated with different integration start times but with the same integration duration, thereby providing the number (N) of chip-phase matched filters for any given code chip.

The decimation circuitry 84 includes averaging filters 126 and 128. In this exemplary embodiment, the number (N) of complex samples (or code phases) is 8, and the desired effective sampling rate is the code chip rate of the PRN code of the L1 signal. Further, it is assumed that the integrators 100 and 102 of the digital downconversion circuitry 82 (FIG. 6) reduce the sampling rate to 8 times the code chip rate, which is approximately 8.181 MHz. The averaging filter 126 includes latches 130-144, subtraction circuitry 146, and integrator 148 arranged as shown. As will be apparent to one of ordinary skill in the art, the averaging filter 126 operates to produce complex samples at a rate of 8.181 MHz, which is the actual sampling rate. Each complex sample is the sum of the 8 most recent samples of the in-phase baseband signal ($I_{BB}$) stored in the latches 130-144.

Likewise, the averaging filter 128 includes latches 150-164, subtraction circuitry 166, and integrator 168 arranged as shown. As will be apparent to one of ordinary skill in the art, the averaging filter 128 operates to produce complex samples at a rate of 8.181 MHz, where each complex sample is the sum of the 8 most recent samples of the quadrature-phase baseband signal ($Q_{BB}$) stored in the latches 150-164.

It should be noted that the averaging filters 126 and 128 are exemplary. Other embodiments of the averaging filters 126 and 128 will be apparent to one of ordinary skill in the art upon reading this disclosure. Further, the averaging filters 126 and 128 may easily be adapted to provide any number of chip-phases, any desired sampling rate, and any integration duration by adjusting the number of latches 130-144 and 150-164 and the clock rate provided to the latches 130-144 and 150-164.

Requantizer 170 operates to requantize each of the complex samples from the averaging filters 126 and 128 to generate a 2-bit sample including a sign bit and a magnitude bit for each of the complex samples. The requantizer 170 combines the 2-bit samples of the in-phase and quadrature-phase baseband signals ($I_{BB}$, $Q_{BB}$) into a 4-bit complex sample. Further, in one embodiment, the requantizer 170 operates to encode each of the 2-bit samples in an offset 1.5 format. More specifically, if the sign bit corresponds to a negative ("−") and the magnitude bit is "1", then the encoded sample is "00" in binary format. If the sign bit is negative and the magnitude bit is "0", then the encoded sample is "01" in binary format. If the sign bit is positive and the magnitude bit is "0", then the encoded sample is "10" in binary format. If the sign bit is positive and the magnitude bit is "1", then the encoded sample is "11" in binary format. As a result, correlation may be performed by the processor 20 (FIG. 1) using a simple exclusive-OR (XOR) operation.

Figures 8A, 8B:
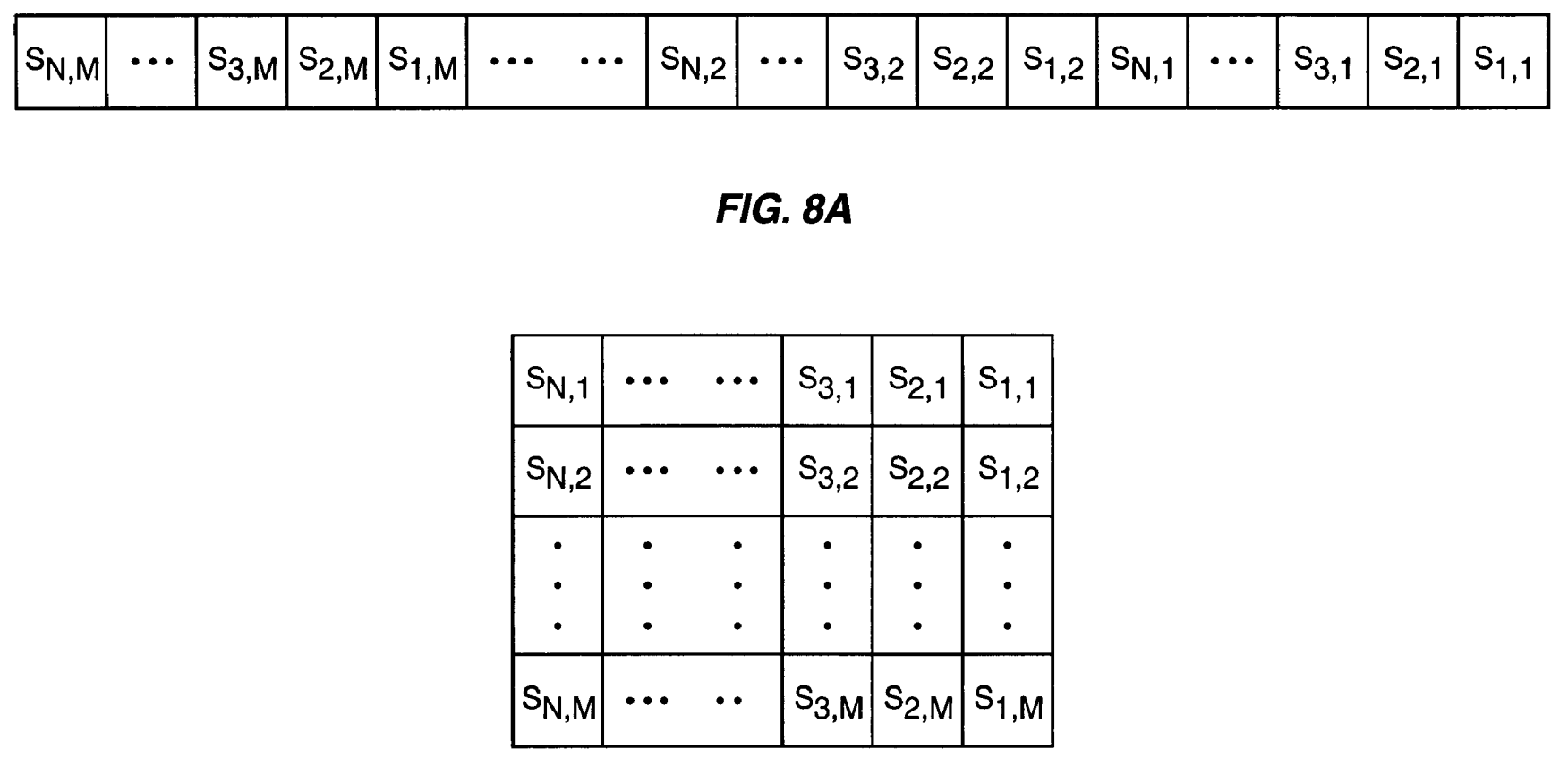

The complex samples output by the requantizer 170 are provided to sample storage and reorganization circuitry 172. The basic operation of the sample storage and reorganization circuitry 172 is best described with respect to FIGS. 8A and 8B. FIG. 8A illustrates the complex samples ($S_{X,Y}$) from the requantizer 170. Recall that the complex samples ($S_{X,Y}$) include the samples for both the in-phase and quadrature-phase baseband signals ($I_{BB}$, $Q_{BB}$). The subscript X is the chip-phase number, and the subscript Y is the sample number. Thus, complex sample $S_{1,1}$ is the first sample for chip-phase PHASE1 (FIG. 4); complex sample $S_{2,1}$ is the first sample for chip-phase PHASE2; complex sample $S_{3,1}$ is the first sample for chip-phase PHASE3; and complex sample $S_{N,1}$ is the first sample for the Nth chip-phase. Recall that for the exemplary embodiments discussed herein, N is 8. Likewise, complex sample $S_{1,2}$ is the second sample for chip-phase PHASE1 (FIG. 4); complex sample $S_{2,2}$ is the second sample for chip-phase PHASE2; complex sample $S_{3,2}$ is the second sample for chip-phase PHASE3; and complex sample $S_{N,2}$ is the second sample for the Nth chip-phase. Complex sample $S_{1,M}$ is the Mth sample for chip-phase PHASE1 (FIG. 4); complex sample $S_{2,M}$ is the Mth sample for chip-phase PHASE2; complex sample $S_{3,M}$ is the Mth sample for chip-phase PHASE3; and complex sample $S_{N,M}$ is the Mth sample for the Nth chip-phase. M may be any positive integer depending on the particular implementation.

As illustrated in FIG. 8B, the sample storage and reorganization circuitry 172 operates to reorganize and store the complex samples ($S_{X,Y}$) such that complex samples from each of the chip-phases (PHASE1-PHASEN) are stored together. More specifically, in this embodiment, each of the M complex samples for the first code phase are stored in the first column, each of the M complex samples for the second code phase are stored in the second column, etc. As a result, the complex samples ($S_{X,Y}$) from the requantizer 170 are reorganized and may be transferred to the processor 20 (FIG. 1) via interface circuitry 86 (FIG. 3) according to chip-phase.

Returning to FIG. 7, this exemplary embodiment of the sample storage and reorganization circuitry 172 includes first and second memory units 174 and 176. The complex samples from the requantizer 170 are stored in the first memory unit 174 in a manner similar to that shown in FIG. 8B, while the second memory unit 176 is read to provide previously stored complex samples to the processor 20 (FIG. 1) via interface circuitry 86 (FIG. 3). Likewise, the complex samples from the requantizer 170 are stored in the second memory unit 176 in a manner similar to that shown in FIG. 8B while the first memory unit 174 is read to provide previously stored complex samples to the processor 20 (FIG. 1) via interface circuitry 86 (FIG. 3).

The complex samples read from the memory units 174 and 176 are transferred from the memory units 174 and 176 to the interface circuitry 86 (FIG. 3) by a series of multiplexers 178-182 and latches 184 and 186. In this embodiment, each of the complex samples stored in the memory units 174 and 176 is four bits and includes a sample having a sign and magnitude bit for each of the in-phase and quadrature-phase baseband signals ($I_{BB}$, $Q_{BB}$). Further, in this embodiment, the data output (DATA) of the multiplexer 182 is an 8-bit output. Accordingly, the multiplexers 178-182 operate to transfer the complex samples from the memory units 174 and 176 eight bits at a time according to chip-phase. Thus, complex samples $S_{1,1}$ and $S_{1,2}$ may first be transferred, then complex samples $S_{1,3}$ and $S_{1,4}$, and so on until each complex sample for the first chip-phase PHASE1 are read from the memory unit 174 or 176. In similar fashion, the complex samples for chip-phases PHASE2-PHASEN are read from the memory unit 174 or 176. In one embodiment, the interface circuitry 86 (FIG. 3) operates to pack multiple 8-bit data units (DATA) from the multiplexer 182 into a single data word, where the data word may be 32 bits. For a 32-bit word, 8 complex samples ($S_{X,Y}$) may be packed into a single data word. In this embodiment, data words for each chip-phase may be successively transferred to the processor 20 (FIG. 1) until all of the complex samples from the memory unit 174 or 176 are transferred to the processor 20. As a result, the processor 20 (FIG. 1) may process multiple complex samples for a selected chip-phase in parallel to further reduce the required throughput of the processor 20.

Then, as described above, the processor 20 (FIG. 3) selects the complex samples for one of the N chip-phases for processing based on the estimated code phase. The selected complex samples are processed to determine location, user clock error, velocity, etc. Thus, while the actual sampling rate of the decimation circuitry 84 is, for example, 8.181 MHz, the effective sampling rate of the complex samples processed by the processor 20 (FIG. 3) is 8.181 MHz/N. If N=8, the effective sampling rate is approximately 1 MHz. Accordingly, the throughput required of the processor 20 is substantially reduced. Further, since the decimation circuitry 84 of the present invention avoids the need for low-pass filtering the digitized in-phase and quadrature-phase baseband signals ($I_{BB}$, $Q_{BB}$) prior to decimation, the code transitions are not obscured by a low pre-sampling bandwidth, and performance is substantially improved.

Those skilled in the art will recognize improvements and modifications to the preferred embodiments of the present invention. All such improvements and modifications are considered within the scope of the concepts disclosed herein and the claims that follow.

What is claimed is:

1. A system for decimating a sampling rate of an input signal comprising:
    a) filtering circuitry adapted to perform a number (N) of integrations of samples of the input signal for each of a plurality of code chips, such that the number (N) of integrations has a common integration period and different integration start times and each of the number (N) of integrations provides one of a number (N) of output samples of the input signal for one of a number (N) of chip-phases; and
    b) processing circuitry adapted to receive the number (N) of output samples for each of the plurality of code chips and process one of the number (N) of output samples corresponding to a select one of the number (N) of chip-phases for each of the plurality of code chips, such that the sampling rate of the input signal is reduced from a first sampling rate to a second sampling rate.

2. The system of claim 1 further comprising sample storage and reorganization circuitry adapted to receive the number (N) of output samples for each of the plurality of code chips and reorganize the output samples such that the output samples are arranged according to chip-phase.

3. The system of claim 2 further comprising interface circuitry adapted to combine a plurality of the output samples for one of the number (N) of chip-phases into a data word, and provide the data word to the processing circuitry.

4. The system of claim 1 wherein the input signal is a quadrature baseband signal comprising an in-phase baseband signal and a quadrature-phase baseband signal, and the filtering circuitry is adapted to:
    receive samples of the in-phase and quadrature-phase baseband signals at the first sampling rate;
    perform the number (N) of integrations of the samples of the in-phase baseband signal for each the plurality of code chips, the number (N) of integrations having the common integration period and different integration start times, wherein each of the number (N) of integrations provides one of a number (N) of output samples of the in-phase baseband signal for one of the number (N) of chip-phases; and
    perform the number (N) of integrations of the samples of the quadrature-phase baseband signal for each of the plurality of code chips, the number (N) of integrations having the common integration period and different integration start times, wherein each of the number (N) of integrations provides one of a number (N) of output samples of the quadrature-phase baseband signal for one of the number (N) of chip-phases.

5. The system of claim 4 wherein for each of the plurality of code chips the number (N) of output samples of the in-phase baseband signal are combined with the number (N) of output samples of the quadrature-phase signal to provide a number (N) of complex samples of the quadrature baseband signal, each of the number (N) of complex samples corresponding to one of the number (N) of chip-phases.

6. The system of claim 4 further comprising sample storage and reorganization circuitry adapted to receive the number (N) of complex samples for each of the plurality of code chips and reorganize the complex samples for each of the plurality of code chips according to chip-phase.

7. The system of claim 6 further comprising interface circuitry adapted to combine a plurality of the complex samples for one of the number (N) of chip-phases into a data word, and provide the data word to the processing circuitry.

8. The system of claim 6 wherein the complex samples are encoded in an offset format such that correlation of the complex samples of the quadrature baseband signal and an internally generated pseudo-random code is performed using an exclusive-OR (XOR) operation.

9. The system of claim 1 further comprising digital down-conversion circuitry adapted to receive an intermediate frequency (IF) signal and downconvert the IF signal to a baseband signal, wherein the baseband signal is provided to the filtering circuitry as the input signal at the first sampling rate.

10. The system of claim 9 wherein the digital downconversion circuitry comprises a frequency rotation system adapted to rotate a frequency of the IF signal based on a frequency of a rotation signal to downconvert the IF signal to the baseband signal, wherein the frequency of the rotation signal is corrected to compensate for a known oscillator error.

11. The system of claim 1 wherein the integration period is essentially equal to the duration of a code chip such that the second sampling rate is the code chip rate.

12. The system of claim 1 wherein the processing circuitry is further adapted to perform a plurality of processes, wherein each of the plurality of processes selects one of the number (N) of output samples corresponding to a select one of the number (N) of chip-phases for each of the plurality of code chips, thereby reducing the sampling rate of the input signal from a first sampling rate to a second sampling rate.

13. A Satellite Positioning System (SPS) receiver comprising:
   decimation circuitry adapted to reduce a sampling rate of a baseband signal and comprising filtering circuitry adapted to perform a number (N) of integrations of samples of the baseband signal for each of a plurality of code chips, such that the number (N) of integrations has a common integration period and different integration start times and each of the number (N) of integrations provides one of a number (N) of output samples of the baseband signal for one of a number (N) of chip-phases; and
   processing circuitry adapted to receive the number (N) of output samples for each of the plurality of code chips and process one of the number (N) of output samples corresponding to a select one of the number (N) of chip-phases for each of the plurality of code chips, such that the sampling rate of the baseband signal is reduced from a first sampling rate to a second sampling rate.

14. A method for decimating a sampling rate of a digital signal comprising:
   performing a number (N) of integrations of samples of an input signal for each of a plurality of code chips, the number (N) of integrations having a common integration period and different integration start times, wherein each of the number (N) of integrations provides one of a number (N) of output samples of the input signal for one of a number (N) of chip-phases; and
   selecting one of the number (N) of output samples corresponding to a select one of the number (N) of chip-phases for each of the plurality of code chips such that the sampling rate of the input signal is reduced from a first sampling rate to a second sampling rate.

15. The method of claim 14 further comprising reorganizing the number (N) of output samples for each of the plurality of code chips such that the output samples are arranged according to chip-phase.

16. The method of claim 15 further comprising combining a plurality of the output samples for one of the number (N) of chip-phases into a data word.

17. The method of claim 14 wherein the input signal is a quadrature baseband signal comprising an in-phase baseband signal and a quadrature-phase baseband signal, and the method further comprises:
   performing the number (N) of integrations of the samples of the in-phase baseband signal for each of the plurality of code chips, the number (N) of integrations having the common integration period and different integration start times, wherein each of the number (N) of integrations provides one of a number (N) of output samples of the in-phase baseband signal for one of the number (N) of chip-phases; and
   performing the number (N) of integrations of the samples of the quadrature-phase baseband signal for each of the plurality of code chips, the number (N) of integrations having the common integration period and different integration start times, wherein each of the number (N) of integrations provides one of a number (N) of output samples of the quadrature-phase baseband signal for one of the number (N) of chip-phases.

18. The method of claim 17 further comprising combining the number (N) of output samples of the in-phase baseband signal with the number (N) of output samples of the quadrature-phase signal to provide a number (N) of complex samples of the quadrature baseband signal for each of the plurality of code chips, each of the number (N) of complex samples corresponding to one of the number (N) of chip-phases.

19. The method of claim 17 further comprising:
   combining the number (N) of output samples of the in-phase baseband signal with the number (N) of output samples of the quadrature-phase signal for each of the plurality of code chips to provide a number (N) of complex samples of the quadrature baseband signal for each of the plurality of code chips, each of the number (N) of complex samples corresponding to one of the number (N) of chip-phases; and
   reorganizing the number (N) of complex samples for each of the plurality of code chips such that the complex samples are arranged according to chip-phase.

20. The method of claim 19 further comprising combining a plurality of the complex samples for one of the number (N) of chip-phases into a data word.

21. The method of claim 19 further comprising encoding the complex samples in an offset format such that correlation of the complex samples of the quadrature baseband signal and an internally generated pseudo-random code is performed using an exclusive-OR (XOR) operation.

* * * * *